United States Patent
Oka (10) Patent No.: US 9,773,319 B2
(45) Date of Patent: Sep. 26, 2017

(54) IMAGE PROCESSING APPARATUS, METHOD, AND MEDIUM

(71) Applicant: CANON KABUSHIKI KAISHA, Tokyo (JP)

(72) Inventor: Hiroyuki Oka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/720,543

(22) Filed: May 22, 2015

(65) Prior Publication Data

US 2015/0339827 A1    Nov. 26, 2015

(30) Foreign Application Priority Data

May 26, 2014    (JP) .................... 2014-108553

(51) Int. Cl.
| | |
|---|---|
| *G06T 7/00* | (2017.01) |
| *G06T 11/00* | (2006.01) |
| *H04N 1/52* | (2006.01) |
| *H04N 1/56* | (2006.01) |
| *G06T 7/13* | (2017.01) |
| *H04N 1/58* | (2006.01) |

(52) U.S. Cl.
CPC .............. *G06T 7/0085* (2013.01); *G06T 7/13* (2017.01); *G06T 11/00* (2013.01); *G06T 11/001* (2013.01); *H04N 1/52* (2013.01); *H04N 1/56* (2013.01); *H04N 1/58* (2013.01)

(58) Field of Classification Search
CPC ......... G06T 7/0085; G06T 11/00; H04N 1/56; H04N 1/52
USPC ....................................................... 382/199
See application file for complete search history.

(56) References Cited

U.S. PATENT DOCUMENTS

| | | | | |
|---|---|---|---|---|
| 2003/0091235 | A1* | 5/2003 | Xiong ............... | G06F 17/30802 382/199 |
| 2012/0224784 | A1* | 9/2012 | Cohen .................... | G06T 5/002 382/260 |
| 2013/0077862 | A1* | 3/2013 | Nomura ................ | H04N 9/045 382/167 |

FOREIGN PATENT DOCUMENTS

JP    11-55503 A    2/1999

\* cited by examiner

*Primary Examiner* — Amandeep Saini
(74) *Attorney, Agent, or Firm* — Canon USA Inc., IP Division (57) ABSTRACT

An image process to be performed on an edge of a character or a line is not performed on pixels included in a mosaic image.

9 Claims, 9 Drawing Sheets

- PIXEL HAVING COLOR DIFFERENT FROM COLOR OF TARGET PIXEL
- PIXEL HAVING COLOR THE SAME AS COLOR OF TARGET PIXEL
- TARGET PIXEL

FIG. 3G

EDGE IS DETECTED
EDGE IS NOT DETECTED

- PIXEL HAVING COLOR DIFFERENT FROM COLOR OF TARGET PIXEL
- PIXEL HAVING COLOR SIMILAR TO COLOR OF TARGET PIXEL
- PIXEL HAVING COLOR THE SAME AS COLOR OF TARGET PIXEL
- TARGET PIXEL

FIG. 3H

EDGE IS NOT DETECTED

FIG. 3C

BACKGROUND

FIG. 3F

- PIXEL HAVING COLOR DIFFERENT FROM COLOR OF TARGET PIXEL
- PIXEL HAVING COLOR THE SAME AS COLOR OF TARGET PIXEL
- TARGET PIXEL

FIG. 3I

EDGE IS DETECTED
EDGE IS NOT DETECTED

GRAY IMAGE

IMAGE PROCESSING APPARATUS, METHOD, AND MEDIUM

BACKGROUND OF THE INVENTION

Field of the Invention

The present disclosure generally relates to image processing and, more particularly, to an image processing apparatus, an image processing method, and a medium.

Description of the Related Art

A technique of detecting edges of characters and lines of an input image has been widely used. Furthermore, an image processing apparatus which performs an image process (such as a black monochromatization process) of enhancing reproducibility of edges on pixels determined to correspond to edges of characters or lines as a result of detection of the edges of characters or lines and which does not perform the image process on other pixels has been widely used (refer to Japanese Patent Laid Open No. 11-55503). By this, an image having clear edges of characters or lines is obtained.

However, even when a pixel is determined to correspond to an edge of a character or a line, the image process is not required to be performed on the pixel in some cases. Such a pixel corresponds to an edge in a mosaic image including blocks of pixels. Each of the blocks includes pixels having the same signal value. The mosaic image is generated when a picture is enlarged by a nearest neighbor method. When detection of an edge and the image process are performed on a mosaic image, a portion which is not determined as an edge of a character or a line in a picture before enlargement is determined as an edge of a character or a line after the enlargement, and therefore, the image process is performed on the portion so as to enhance reproducibility of the edge. Specifically, an internal portion of the picture to be smoothly reproduced is sharply reproduced, and accordingly, unnatural image is obtained.

SUMMARY OF THE INVENTION

The present disclosure provides an image processing apparatus including a first determination unit configured to determine whether a target pixel in an input image is a pixel of an edge portion, and a second determination unit configured to determine whether the target pixel is included in a mosaic image. In a case where it is determined that the target pixel is a pixel of the edge portion and the target pixel is included in the mosaic image, an image process is not performed, and the image process is performed when it is determined that the target pixel is the pixel of the edge portion and the target pixel is not included in the mosaic image.

An image process to be performed for sharply displaying an edge may be suppressed.

Further features of the present disclosure will become apparent from the following description of exemplary embodiments with reference to the attached drawings.

DESCRIPTION OF THE EMBODIMENTS

Figure 10A:
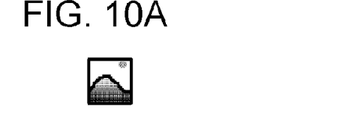
FIGS. 10A to 10E are diagrams illustrating mosaic images.
Figure 10B:
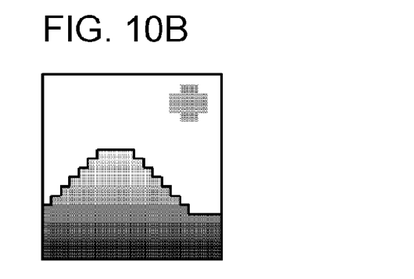
Figure 10C:
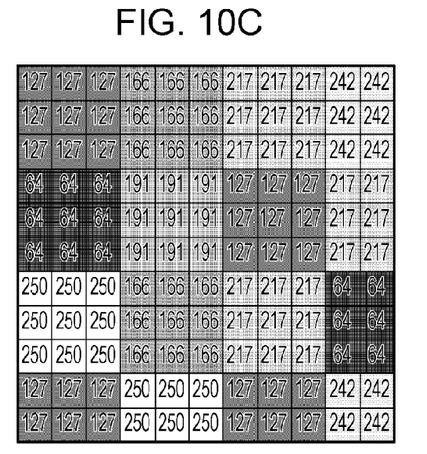
Figure 10D:
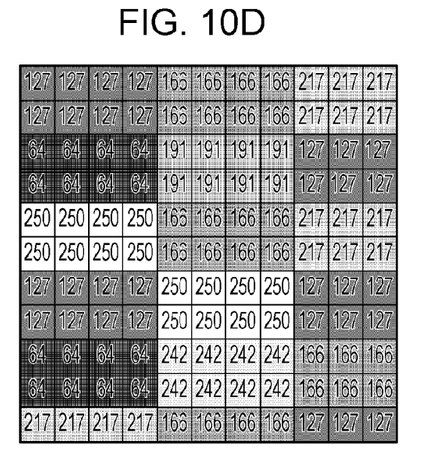
Figure 10E:
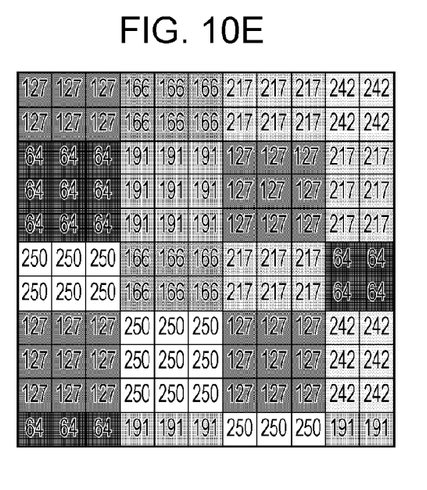

First, a mosaic image will be described. A mosaic image is an image in which blocks of pixels are arranged. Each of the blocks includes pixels having the same signal value. Examples of the mosaic image include an image including blocks of pixels in a matrix of 3 rows and 3 columns, and each of the blocks includes pixels having the same signal value as illustrated in FIG. 10C. Such an image is generated when an image illustrated in FIG. 10B is obtained by enlarging a picture image illustrated in FIG. 10A three times in vertical and horizontal directions by the nearest neighbor method, for example. Any method may be employed instead of the nearest neighbor method. Note that FIG. 10D is a diagram illustrating a portion of a mosaic image obtained when an image is enlarged twice in the vertical direction and four times in the horizontal direction by the nearest neighbor method. As illustrated in FIG. 10D, magnification factors in vertical and horizontal directions may be different from each other. Furthermore, FIG. 10E is a diagram illustrating a portion of a mosaic image obtained when an image is enlarged 2.5 times in the vertical direction and three times in the horizontal direction by the nearest neighbor method. Since only an integer may be set as a size of a tile, the image is enlarged twice or three times in the vertical direction. That is, a magnification rate of an image may be a decimal.

Hereinafter, embodiments of the present disclosure will be described with reference to the accompanying drawings.

First Embodiment

In a first embodiment, an example of an image processing apparatus which detects a mosaic region in an input image and cancels an image process to be performed for obtaining clear edges is described as an example.

Figure 1:
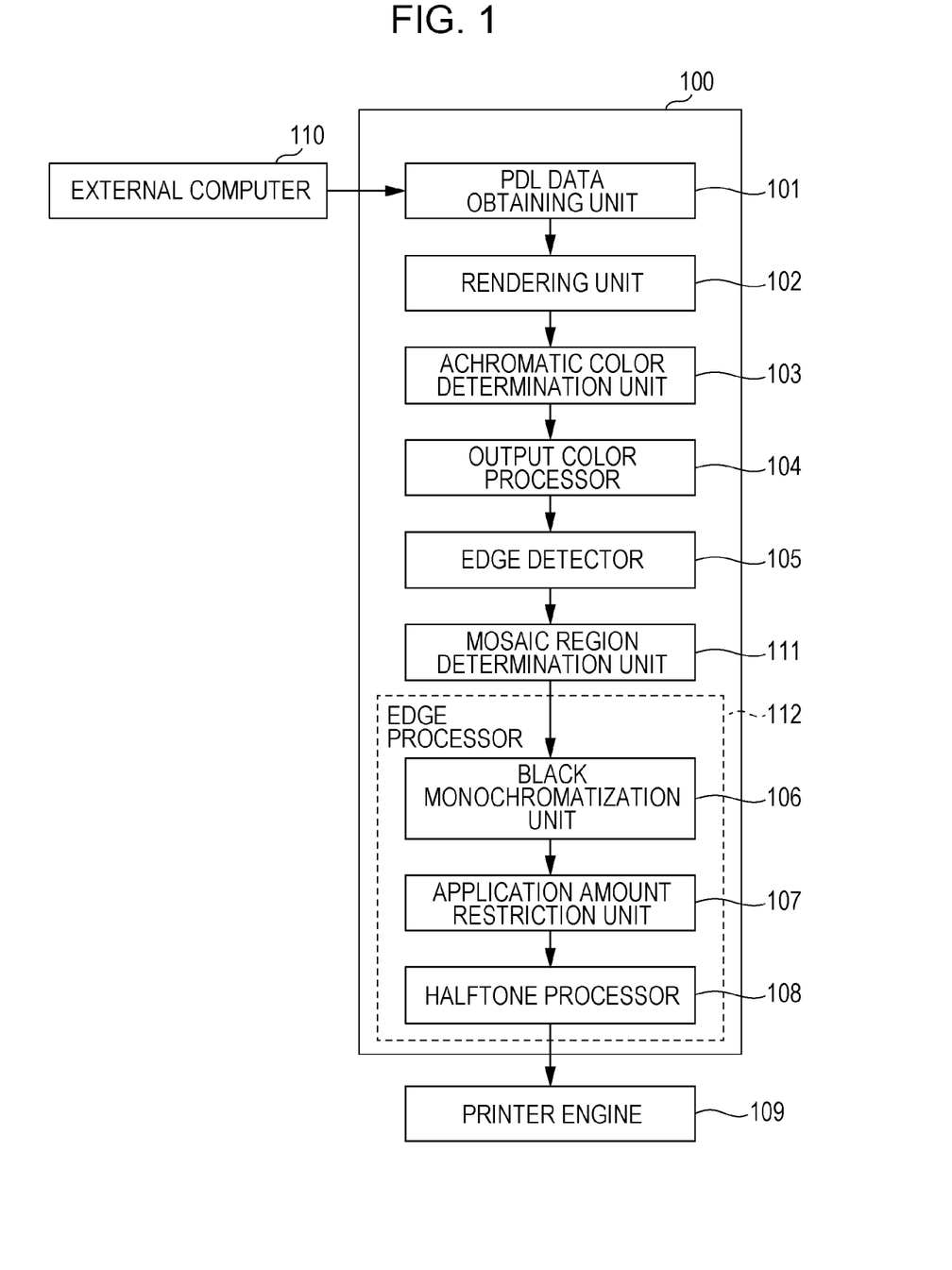
FIG. 1 is a diagram illustrating a configuration of an image processing apparatus according to a first embodiment.

FIG. 1 is a diagram illustrating a configuration of the image processing apparatus according to the first embodiment. An image processing apparatus 100 includes a PDL (page description language) data obtaining unit 101, a rendering unit 102, an achromatic color determination unit 103, an output color processor 104, an edge detector 105, a mosaic region determination unit 111, an edge processor 112, and a printer engine 109. The edge processor 112 includes a black monochromatization unit 106, an application amount restriction unit 107, and a halftone processor 108. As used herein, the term "unit" generally refers to any combination of software, firmware, hardware, or other component, such as circuitry, that is used to effectuate a purpose.

The image processing apparatus 100 further includes a CPU (central processing unit), a ROM (read only memory), and a RAM (random access memory) which are not illustrated. The CPU loads a program of the image processing apparatus 100 and executes the program of the image processing apparatus 100 using the RAM as a primary storage region. By this operation, processes of the various units (the PDL data obtaining unit 101 to the halftone processor 108 and the mosaic region determination unit 111) are executed.

PDL Data Obtaining Unit 101

The PDL data obtaining unit 101 outputs PDL data to the rendering unit 102 when receiving the PDL data from an external computer 110. The PDL data includes an instruction for rendering a plurality of objects.

Rendering Unit 102

The rendering unit 102 generates a rendering image (which is referred to as an "RGB image" in this embodiment) and an attribute image in accordance with the PDL data supplied from the PDL data obtaining unit 101 and outputs the rendering image and the attribute image to the achromatic color determination unit 103. The numbers of pixels in vertical and horizontal directions of the attribute image are the same as those of the rendering image, and the attribute image has information (flags) used to perform switching between on and off of an image process performed on the pixels.

Figure 2:
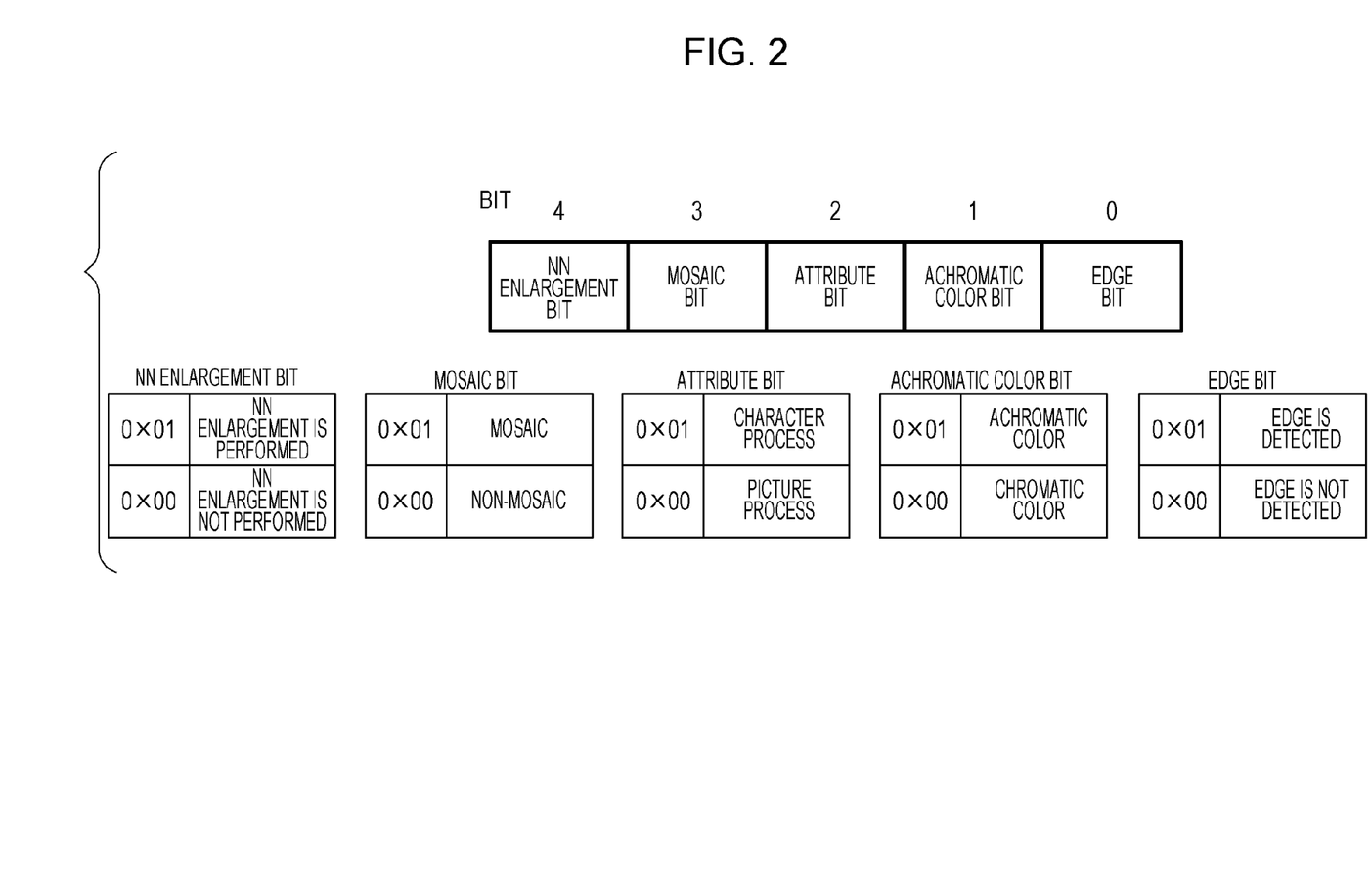
FIG. 2 is a diagram illustrating a data structure of an attribute image according to the first embodiment.

FIG. 2 is a diagram illustrating a data structure of the attribute image according to this embodiment. In an example of FIG. 2, information stored in one pixel in the attribute image has 5 bits in total, that is, an NN enlargement bit of 1 bit, a mosaic bit of 1 bit, an attribute bit of 1 bit, an achromatic color bit of 1 bit, and an edge bit of 1 bit. Note that "NN" is an abbreviation of "nearest neighbor".

A pixel having an NN enlargement bit representing 1 is rendered when a bitmap image of a picture or the like is enlarged by the nearest neighbor method whereas a pixel having an NN enlargement bit representing 0 is not the pixel rendered when a bitmap image of a picture or the like is enlarged by the nearest neighbor method. A pixel having a mosaic bit representing 1 is included in a mosaic image whereas a pixel having a mosaic bit representing 0 is not included in a mosaic image. A pixel having an attribute bit representing 1 is to be subjected to a character process whereas a pixel having an attribute bit representing 0 is to be subjected to a picture process. A pixel having an achromatic color bit representing 1 has a color value in the vicinity of gray (a pixel of an achromatic color) in the rendering image whereas a pixel having an achromatic color bit representing 0 does not have a color value in the vicinity of gray (a pixel of a chromatic color). A pixel having an edge bit representing 1 corresponds to an edge of the rendering image whereas a pixel having an edge bit representing 0 does not correspond to an edge.

Generation of an attribute image will be described in detail.

Before an attribute image is generated, first, the rendering unit 102 prepares an initialized attribute image. The initialized attribute image include pixels having NN enlargement bits representing that the NN enlargement is not performed (0), mosaic bits representing that an mosaic image is not detected (0), attribute bits representing that the picture process is performed (0), achromatic color bits representing a chromatic color (0), and edge bits representing that an edge is not detected.

In this state, attribute bits of pixels in which an object is rendered are set to represent that a character process is performed (1) if the object is a character object or a line object. Furthermore, when an object other than a character object and a line object is rendered on the pixels or when any object is not rendered on the pixels, the attribute bits of the pixels representing that the picture process is performed (0) are not changed. Furthermore, when a picture object is rendered in an enlargement manner by the nearest neighbor method, the attribute bits are set to represent the picture process (0) and the mosaic bits are set to represent that a mosaic image is detected (1). A determination as to whether the picture object is to be enlarged by the nearest neighbor method is made in accordance with an instruction included in a header portion of a PDL header. Note that the rendering unit 102 overwrites pixels in which a plurality of objects are rendered in the rendering image and the attribute image by information on a rendering instruction of a latest object (an object in a foremost position) rendered on the pixels.

Achromatic Color Determination Unit 103

The achromatic color determination unit 103 receives the RGB (red, green, blue) image and the attribute image from the rendering unit 102 and determines whether individual pixels correspond to an achromatic color in accordance with RGB values of the pixels in the RGB image.

The achromatic color determination unit 103 changes the attribute image by setting a flag representing an achromatic color (1) to achromatic color bits of pixels determined to correspond to an achromatic color before outputting the RGB image and the changed attribute image to the output color processor 104. Note that flags of achromatic color bits of pixels which are not determined as an achromatic color represent 0.

Here, the term "achromatic color" generally means colorless (for example, black, white, and gray). However, the meaning may have a narrow range. For example, a pixel in which a difference between a color value of R and a color value of G, a difference between the color value of G and a color value B, and a difference between the color value of B and the color value of R, are all within a certain threshold value is determined to have an achromatic color, and otherwise, determined to have a chromatic color. Other methods may be employed as long as the meaning has a range. Examples of the method include a method for converting color values of RGB into color values of YUV (luminance-bandwidth-chrominance) and determining that a pixel in which a color value of U and a color value of V are both within a threshold value corresponds to an achromatic color.

Output Color Processor 104

The output color processor 104 receives the RGB image and the attribute image from the achromatic color determination unit 103 and performs a color process on the RGB image in accordance with the attribute image. By this, a CMYK (cyan, magenta, yellow, black) image is generated. Thereafter, the output color processor 104 outputs the CMYK image and the attribute image to the edge detector 105.

For example, the output color processor 104 converts an RGB value of a pixel which has an attribute bit representing a character process (1) and an achromatic color bit representing an achromatic color (1) into a K single color (a color value of only a K color material, that is, a CMYK value which satisfies expressions "C=M=Y=0" and "0<K"). Specifically, the output color processor 104 converts an RGB value of an achromatic color portion which represents a character object or a line object in the PDL data into a K single color. The RGB values of the other pixels are converted into CMYK values (in which one of C, M, and Y is not 0).

Edge Detector 105 (Detailed Description Will be Made Later)

The edge detector 105 receives the CMYK image and the attribute image from the output color processor 104 and detects an edge of a character or a line in the CMYK image. The edge detector 105 overwrites the attribute image by setting a flag representing that an edge is detected (1) in an edge bit of a pixel in which an edge is detected. Thereafter, the edge detector 105 outputs the attribute image which has been overwritten and the CMYK image to the mosaic region determination unit 111.

Mosaic Region Determination Unit 111

The mosaic region determination unit 111 receives the CMYK image and the attribute image from the edge detector 105 and detects a mosaic image in the CMYK image. Then the mosaic region determination unit 111 sets a flag representing that a mosaic image is detected (1) to mosaic bits of pixels included in the detected mosaic image. Furthermore, the mosaic region determination unit 111 sets the flag representing that a mosaic image is detected (1) to mosaic bits of pixels in which the flag representing that NN enlargement is performed (1) is set in the NN enlargement bits. Specifically, the mosaic region determination unit 111 sets the flag representing that a mosaic image is detected (1) to pixels included in a mosaic image or pixels in which the flag representing that NN enlargement is performed is set.

Thereafter, the mosaic region determination unit 111 outputs the attribute image which has been overwritten and the CMYK image to the black monochromatization unit 106. A process performed by the mosaic region determination unit 111 will be described later in detail.

Black Monochromatization Unit 106

The black monochromatization unit 106 receives the CMYK image and the attribute image from the mosaic region determination unit 111. Thereafter, the black monochromatization unit 106 converts color values (CMYK values) of pixels having a mosaic bit representing that a mosaic image is not detected (0), an attribute bit representing a picture process (0), an achromatic color bit representing an achromatic color (1), and an edge bit representing that an edge is detected (1) into a K single color. This conversion process is referred to as a "black monochromatization process". Then the black monochromatization unit 106 outputs the CMYK image which has been subjected to the black monochromatization process and the attribute image supplied from the edge detector 105 to the application amount restriction unit 107.

Application Amount Restriction Unit 107

The application amount restriction unit 107 receives the CMYK image which has been subjected to the black monochromatization process and the attribute image from the black monochromatization unit 106 and performs restriction such that a sum of color values of CMYK color materials does not exceed a color material application amount restriction value. The application amount restriction unit 107 outputs the CMYK image obtained through the restriction and the attribute image supplied from the black monochromatization unit 106 to the halftone processor 108. Note that the RGB image and the CMYK image are multivalued images unless otherwise noted.

Halftone Processor 108 and Printer Engine 109

The halftone processor 108 converts the multivalued CMYK image supplied from the application amount restriction unit 107 into a binary CMYK image which is a latent image of color materials of the printer engine 109 and outputs the binary CMYK image to the printer engine 109. The printer engine 109 finally forms the color materials on an output medium, such as a sheet, in accordance with the binary CMYK image supplied from the halftone processor 108.

Detailed Description of Edge Detector 105

The edge detector 105 will be described in detail.

The edge detector 105 detects an edge of a character or a line in a CMYK image and sets edge flags of pixels in which an edge of a character or a line is detected to 1 which represents that an edge is detected. Edge flags of pixels in which an edge of a character or a line is not detected are not changed, that is, 0.

Figure 3A:
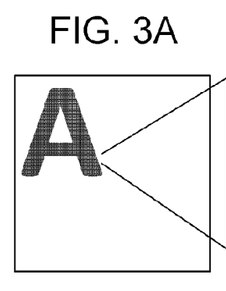
FIGS. 3A to 3I are diagrams illustrating detection portions of an edge detector according to the first embodiment.
Figure 3B:
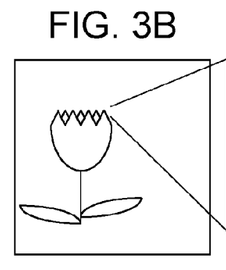
Figure 3C:
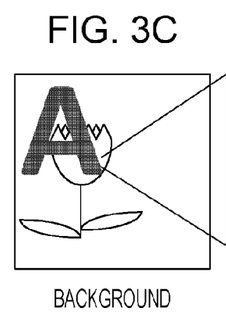

FIGS. 3A to 3C conceptually represent a CMYK image in which a character is rendered, a CMYK image in which a picture is rendered, and a CMYK image in which a picture including a character is rendered, respectively.

Figure 3D:
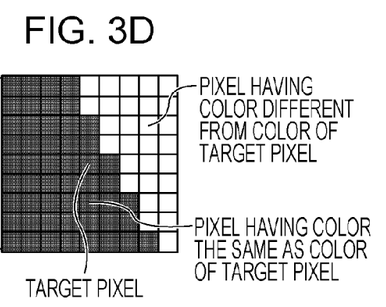
Figure 3E:
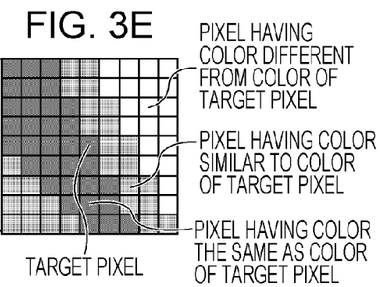
Figure 3F:
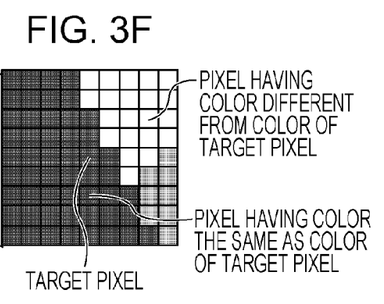

Certain pixels included in the CMYK images are determined as target pixels, and results of extraction of target windows in a matrix of 9 rows and 9 columns including the target pixels and pixels around the target pixels will be illustrated in FIGS. 3D to 3F.

According to FIG. 3D, a larger number of pixels having a color the same as that of the target pixel are positioned, a smaller number of pixels having a color similar to that of the target pixel are positioned, and a larger number of pixels having a color different from that of the target pixel are positioned in the vicinity of an edge of a character or a line. According to FIG. 3E, a smaller number of pixels having a color the same as that of the target pixel are positioned and a larger number of pixels having a color similar to the target pixel are positioned in the vicinity of an edge of a picture. According to FIG. 3F, a larger number of pixels having a color the same as that of the target pixel are positioned, a smaller number of pixels having a color similar to that of the target pixel are positioned, and a larger number of pixels having a color different from that of the target pixel are positioned in the vicinity of an edge of a character in a picture.

Figure 3G:
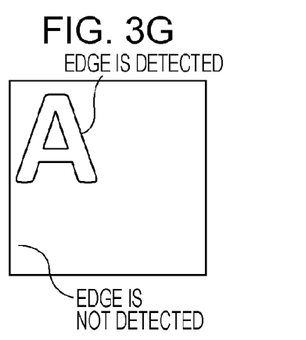
Figure 3H:
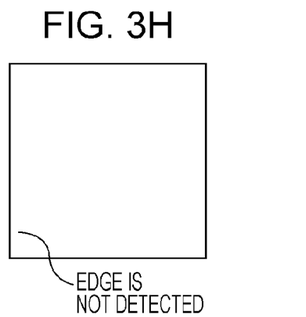
Figure 3I:
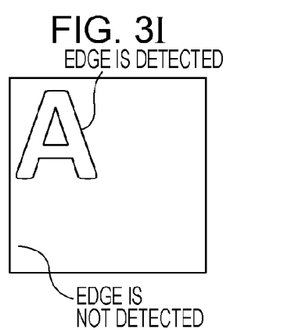

Making use of the characteristic described above, the edge detector 105 sets an edge bit of the target pixel such that the edge bit represents that an edge is detected (1) when a larger number of pixels having a color the same as that of the target pixel are positioned, a smaller number of pixels having a color similar to that of the target pixel are positioned, and a larger number of pixels having a color different from that of the target pixel are positioned in the vicinity of the target pixel. Results of detection performed by the edge detector 105 on the rendering images of FIGS. 3A to 3C are represented as FIGS. 3G to 3I. In this way, only edge portions of a character or a line may be extracted.

That is, a larger number of pixels having a color the same as that of the target pixel represents that the target pixel is included in a character or a line. A smaller number of pixels having a color similar to that of the target pixel represents that gradual change in density is not detected in the vicinity of the target pixel, that is, the target pixel is not included in a picture (that is, the target pixel may be included in a character). Furthermore, a larger number of pixels having a color different from that of the target pixel represents that an edge may be detected in the vicinity of the target pixel. In this embodiment, only when all these three conditions are satisfied, it is determined that the target pixel is included in an edge of a character or a line. However, since the three conditions suggest different contents, only one or two of the three conditions may be employed.

Note that the pixels having a color the same as that of the target pixel (that is, an identical color) represent pixels having a color (a CMYK value in this embodiment) different from that of the target pixel by a value less than a threshold value A (thA). Furthermore, the pixels having a color similar to that of the target pixel represent pixels having a color different from that of the target pixel by a value not less than the threshold value A and less than a threshold value B (thB). Moreover, the pixels having a color different from that of the target pixel represent pixels having a color different from that of the target pixel by a value not less than the threshold value B.

Here, examples of a method for calculating a color difference include a method for obtaining maximum values of differences between a CMYK value of the target pixel and a CMYK value of a selected pixel for individual color components ($\Delta C$, $\Delta M$, $\Delta Y$, and $\Delta K$). Furthermore, the examples include a sum of $\Delta C$, $\Delta M$, $\Delta Y$, and $\Delta K$ and a sum of mean square. However, the method is not limited to these and any method may be employed as long as a calculation method may represent a color difference.

Furthermore, in a case where CMYK values of individual pixels are individually 8 bits (0 to 255) and maximum values of $\Delta C$, $\Delta M$, $\Delta Y$, and $\Delta K$ are used for the method for calculating a color difference, the threshold value A is preferably 2 or more (16 or so, for example) and the threshold value B is preferably 64 or so. However, these values are changed depending on a calculation expression used in the color conversion performed by the output color processor 104, and accordingly, it is not necessarily appropriate to precisely determine the values and each designer preferably sets appropriate threshold values through experiments. To determine preferable threshold values, using the threshold values A and B provided by the inventor as a starting point, a designer preferably performs fine adjustment while checking whether an edge is appropriately determined. Note that the threshold value A is not 1 but preferably 2 or more on the assumption that JPEG compression is employed. Although JPEG compression is not particularly illustrated in FIG. 1, a system in which a process of performing JPEG compression, storage, and decompression is inserted between the achromatic color determination unit 103 and the output color processor 104 may be employed. In this case, variation may be slightly generated in a color of a character or a line constituted by pixels having the complete same color (complete identical color). To absorb such variation, a value larger than 1 is preferably set to the threshold value A.

Note that, in this specification, the term "complete identical color" and the term "identical color (the same color)" have different meanings. A state in which a certain pixel and another pixel have a complete identical color represents that a difference between a color of the certain pixel and a color of the other pixel is 0. On the other hand, a state in which a certain pixel and another pixel have an identical color represents that a difference between a color of the certain pixel and a color of the other pixel is smaller than the threshold value A. Depending on a setting of the threshold value A, the term "complete identical color" may be the same as the term "identical color".

Flowchart of Edge Detector 105

Figure 4:
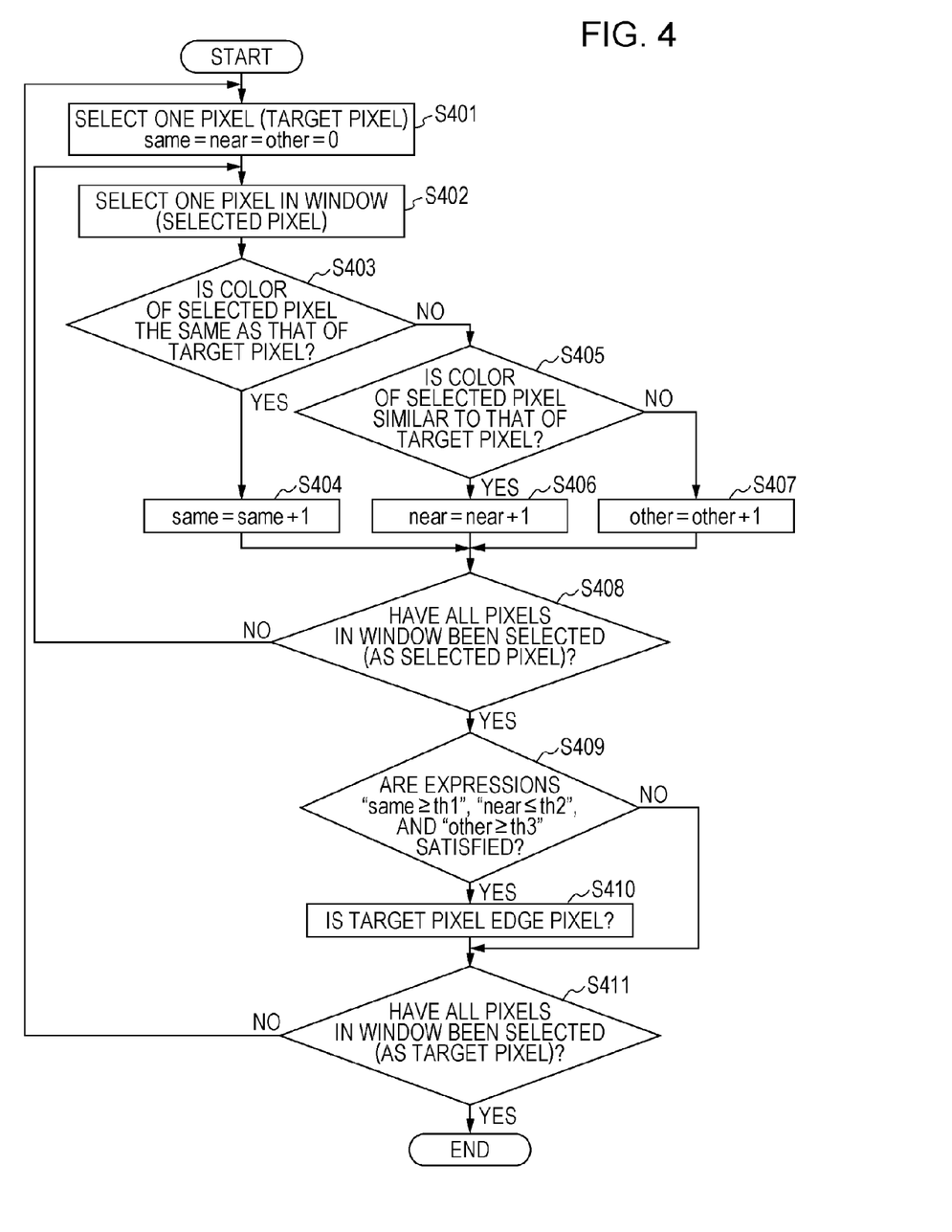
FIG. 4 is a flowchart illustrating a process performed by the edge detector according to the first embodiment.

A flow of a process performed by the edge detector 105 will be described with reference to a flowchart illustrated in FIG. 4.

The edge detector 105 successively selects one of pixels starting from an upper left portion as a target pixel. First, the edge detector 105 sets 0 to the number of same-color pixels (same), the number of similar-color pixels (near), and the number of different-color pixels (other) (step S401). Next, the edge detector 105 selects one of pixels included in a window (in a range in a matrix of 9 rows and 9 columns including the target pixel as a center, for example) (step S402). The edge detector 105 determines whether the selected pixel and the target pixel have an identical color (step S403), and when the determination is affirmative, the edge detector 105 adds 1 to the number of same-color pixels (same) (step S404). On the other hand, when the determination is negative in step S403, the edge detector 105 determines whether the selected pixel and the target pixel have a similar color (step S405). When the determination is affirmative, the edge detector 105 adds 1 to the number of similar-color pixels (near) (step S406). When the determination is negative in step S405, the edge detector 105 adds 1 to the number of different-color pixels (other) (step S407). The edge detector 105 determines whether all the pixels included in the window have been selected (step S408). When the determination is negative, the edge detector 105 selects an unprocessed pixel (step S402). By the process described above, a number of same-color pixels, a number of similar-color pixels, and a number of different-color pixels are counted.

After a number of same-color pixels, a number of similar-color pixels, and a number of different-color pixels are counted, the edge detector 105 determines whether the number of same-color pixels is equal to or larger than a threshold value 1 (th1), the number of similar-color pixels is equal to or smaller than a threshold value 2 (th2), and the number of different-color pixels is equal to or larger than a threshold value 3 (th3) (step S409). When the determination is affirmative in step S409, the edge detector 105 determines that the target pixel corresponds to an edge and sets 1 to the edge bit of the attribute image.

The edge detector 105 determines whether all the pixels have been set as the target pixel (step S411). When the determination is negative, the edge detector 105 selects an unprocessed pixel (step S401). By executing the process from step S401 to step S411 described above on all the pixels, the edge detector 105 detects only an edge of a character or a line included in the CMYK image.

Here, the threshold value 1 is preferably 5 or so, the threshold value 2 is preferably 2 or so, and the threshold value 3 is preferably 5 or so. However, the preferable values of the threshold values 1 to 3 vary depending on a size of the window or a method for setting the threshold values A and B. Therefore, it is not necessarily appropriate to precisely determine the values and each designer preferably sets appropriate threshold values through experiments. To determine the preferable threshold values, using the threshold values 1 to 3 provided by the inventor as a starting point, a designer preferably performs fine adjustment while checking whether an edge is appropriately determined.

Detailed Description of Mosaic Region Determination Unit 111

A process of the mosaic region determination unit 111 will be described in detail with reference to a flowchart of FIG. 5.

The mosaic region determination unit 111 determines a region including a mosaic image (that is, an image including blocks of pixels, each of the blocks including pixels having the same signal value). The mosaic region determination unit 111 assigns a window of a predetermined size to the CMYK image, analyzes whether pixels in the window have a characteristic of a mosaic pattern, and sets 1 to a mosaic bit of a target pixel at the center when the pixels in the window have the characteristic of a mosaic pattern. The mosaic region may be detected by performing this process while the window is shifted in the entire image. Hereinafter, this process will be descried in detail. It is assumed that the window has a region including pixels in a matrix of 11 rows and 11 columns including a target pixel at the center in this embodiment. However, a size of the window may be arbitrarily set.

The mosaic region determination unit 111 determines whether an NN enlargement bit of the target pixel represents that NN enlargement is performed (1) (step S501). When the determination is affirmative, the region has a mosaic pattern since the nearest neighbor enlargement is performed in response to a PDL command, and accordingly, a flag 1 representing that a mosaic image is detected is set to a mosaic bit of the target pixel and the process is terminated (step S502). When the determination is negative in step S501, an analysis performed for determining whether the region has a mosaic pattern is performed. Therefore, it is determined whether a characteristic of a mosaic pattern is detected in the window in a process below. The process will be described with reference to FIGS. 6, 7A, and 7B.

Figure 6:
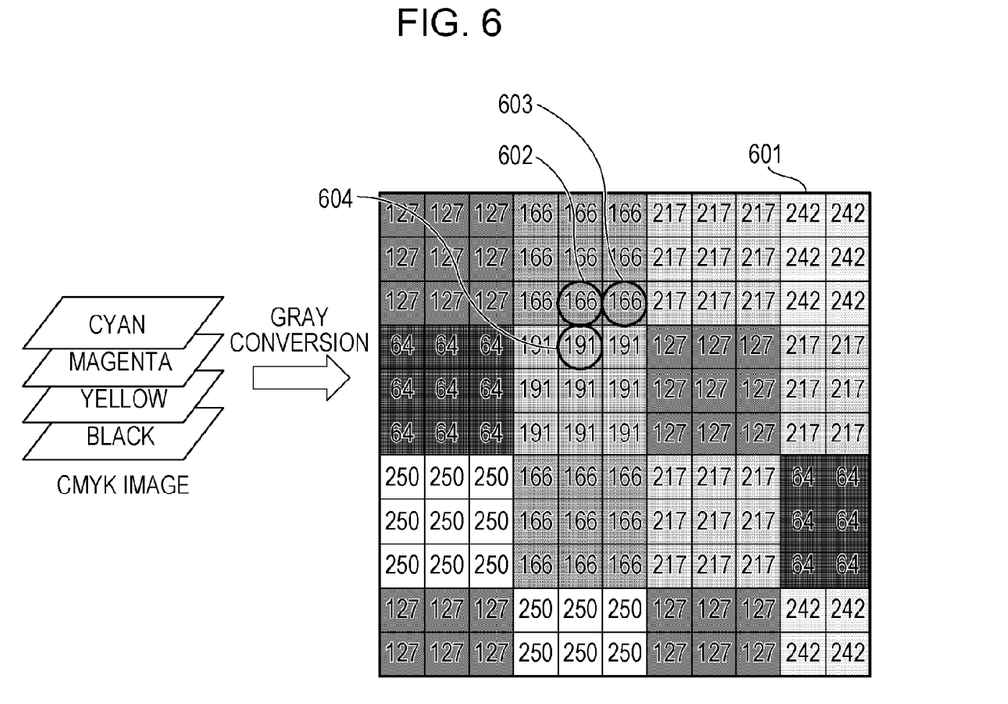
FIG. 6 is a diagram illustrating a process performed by the mosaic region determination unit according to the first embodiment.

First, pixels in the window are subjected to gray conversion so that a gray image 601 is generated (step S503). Although any method may be employed for the gray conversion, Expression 1 is used as an example in this embodiment.

(Gray Signal)=0.3×(255−$C$)+0.6×(255−$M$)+0.1× (255−$Y$)−$K$   (Expression 1)

Figure 7A:
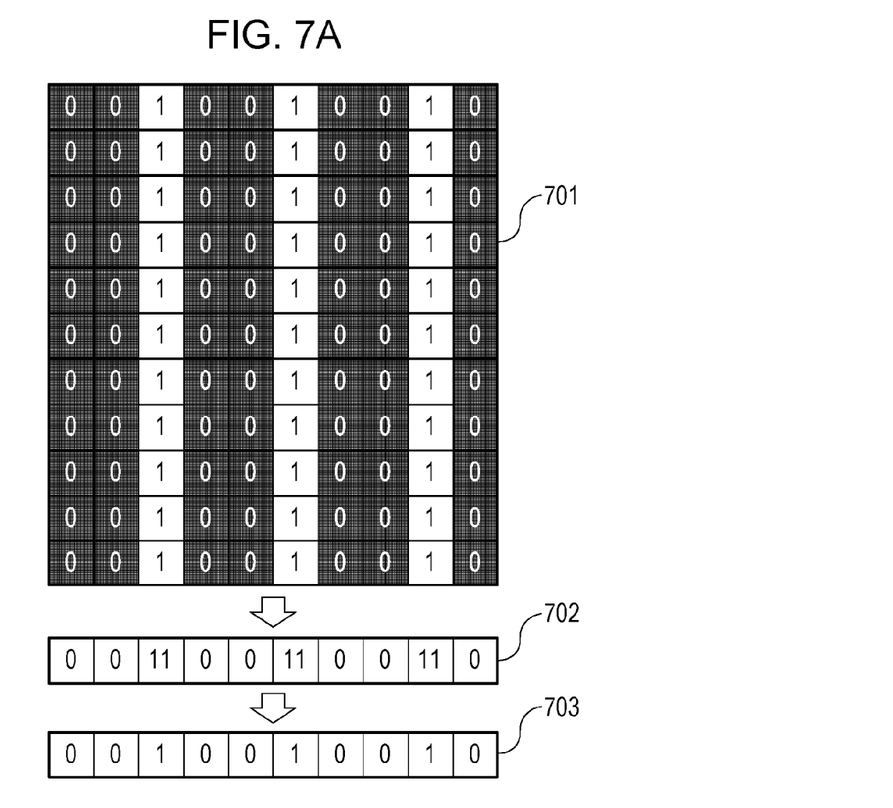
FIGS. 7A and 7B are diagrams illustrating data in horizontal and vertical directions during calculation according to the first embodiment.

Next, a horizontal edge flag image 701 representing presence or absence of an edge in the horizontal direction (for example, a sub scanning direction) is generated (step S504). Specifically, when a difference between the target pixel and a reference pixel located adjacent to the target pixel on a right side (or a left side) is larger than a predetermined threshold value (5, for example), 1 (representing that an edge is detected) is set to the target pixel. When a target pixel 602 of FIG. 6 is taken as an example, since a difference between the target pixel 602 and a reference pixel 603 located adjacent to the target pixel 602 on a right side is 5 or less, 0 (representing that an edge is not detected) is set to a corresponding pixel in the horizontal edge flag image 701.

Figure 7B:
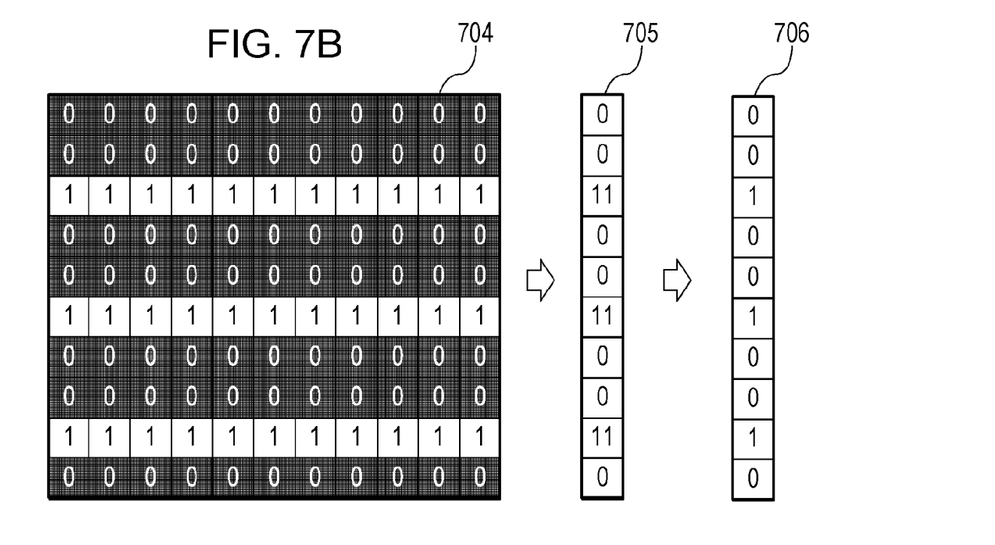

Similarly, a vertical edge flag image 704 representing presence or absence of an edge in the vertical direction (for example, a main scanning direction) is generated (step S505). Specifically, when a difference between the target pixel and a reference pixel located adjacent to the target pixel on a lower side (or an upper side) is larger than a predetermined threshold value (5, for example), 1 (representing that an edge is detected) is set to the target pixel. When the target pixel 602 of FIG. 6 is taken as an example, since a difference between the target pixel 602 and a reference pixel 604 located adjacent to the target pixel 602 on the lower side is larger than 5, 1 (representing that an edge is detected) is set to corresponding pixels in the vertical edge flag image 704.

Subsequently, a horizontal count array 702 is generated by counting a number of flags representing 1 in a column direction in the horizontal edge flag image 701. Using the horizontal count array 702, 1 is set to columns in which results of the counting exceed a predetermined threshold value (6, for example) and 0 is set to other columns so that a horizontal edge array 703 is generated (step S506).

Furthermore, a vertical count array 705 is generated by counting a number of flags representing 1 in a row direction in the vertical edge flag image 704. Using the vertical count array 705, 1 is set to rows in which results of the counting exceed a predetermined threshold value (6, for example) and 0 is set to other columns so that a vertical edge array 706 is generated (step S507).

Thereafter, a minimum value (pitch_h_min) and a maximum value (pitch_h_max) of a pitch (that is, a distance) between columns having the flag representing 1 in the horizontal edge array 703 are obtained (step S508).

Furthermore, a minimum value (pitch_v_min) and a maximum value (pitch_v_max) of a pitch between rows having the flag representing 1 in the vertical edge array 706 are obtained (step S509).

Finally, if the values pitch_h_min, pitch_h_max, pitch_v_min, and pitch_v_max satisfy predetermined conditions, it is determined that the target pixel is included in the mosaic image (step S510).

That is, the values pitch_h_min, pitch_h_max, pitch_v_min, and pitch_v_max satisfy a condition in which a value obtained by subtracting the value pitch_h_min from the value pitch_h_max and a value obtained by subtracting pitch_v_min from pitch_v_max are both equal to or smaller than 1 and a condition in which the value pitch_h_min and the value pitch_v_min are both equal to or larger than 2.

Note that a case where the value obtained by subtracting the value pitch_h_min from the value pitch_h_max and the value obtained by subtracting the value pitch_v_min from the value pitch_v_max are both equal to or smaller than 1 represents a state in which blocks of pixels having the same size are arranged in the horizontal and vertical directions as a tile pattern. Furthermore, a case where the value pitch_h_min and the value pitch_v_min are both equal to or larger than 2 represents that a size of a tile is equal to or larger than 2.

When it is determined that the target pixel is included in the mosaic image, 1 is set to a mosaic bit of the target pixel in the window (step S502). When it is determined that the target pixel is not included in the mosaic image, 0 set in the mosaic bit is not changed and the process is terminated.

The process described above is performed on all the pixels while one of the pixels is successively set as the target pixel.

Detailed Description of Black Monochromatization Unit 106

The black monochromatization unit 106 will be described in detail.

The black monochromatization unit 106 refers to the attribute image for each pixel and converts color values (CMYK values) of pixels having a mosaic bit representing that a mosaic image is not detected (0), an attribute bit representing a picture process (0), an achromatic color bit representing achromatic color (1), and an edge bit representing that an edge is detected (1) into a K single color. The black monochromatization unit 106 does not convert color values of the other pixels as described hereinafter. Here, a value of K after the conversion may be represented by the following expression using the CMYK values obtained before the conversion: K+(C+M+Y)/3, for example. Furthermore, as another example, the value of K after the conversion may be obtained using a table in which a difference between a color density of an image output from the printer engine 109 obtained by performing the conversion and a color density of an image output from the printer engine 109 obtained without performing the conversion becomes minimum. Note that the black monochromatization unit 106 does not change color values (CMYK values) of pixels having an achromatic color bit representing a chromatic color (0), pixels having an edge bit representing that an edge is not detected (0), and pixels having a mosaic bit representing that a mosaic image is detected (1).

By the process described above, even pixels of achromatic colors which are not converted into a K single color by the output color processor 104 (that is, pixels which are not determined as a character object or a line object in the PDL data) may be output by a black monochromatization if the pixels look like a character or a line. Accordingly, while an achromatic color portion in a picture is richly reproduced, running of color from an edge of a character or a line caused by misregistration of the printer engine 109 may be reduced, and as a result, the edge of a character or a line may be sharply displayed.

Detailed Description of Application Amount Restriction Unit 107

The application amount restriction unit 107 will be described in detail.

The application amount restriction unit 107 reduces a sum of CMYK values of pixels having a mosaic bit representing that a mosaic image is not detected (0) and an edge bit representing that an edge is detected (1) to a threshold value THd1 which is a color material application amount restriction value when the sum exceeds the threshold value THd1. Furthermore, the application amount restriction unit 107 reduces a sum of CMYK values of other pixels (that is, pixels having a mosaic bit representing that a mosaic image is detected (1) or an edge bit representing that an edge is not detected (0)) to a threshold value THd2 when the sum exceeds the threshold value THd2. The threshold value THd1 is smaller than the Thd2. As described hereinabove, by restricting an application amount by a small color material application amount restriction value in an edge of a character or a line as a target, color materials on the edge of a character or a line may be displayed without spattering.

Detailed Description of Halftone Processor 108

The halftone processor 108 will be described in detail.

The halftone processor 108 refers to the attribute image for each pixel and converts the rendering image (a multivalued CMYK image) into a binary CMYK image.

The halftone processor 108 converts pixels having an edge bit representing that an edge is not detected (0) and a mosaic bit representing that a mosaic image is detected (1) into binary using a low LPI (Lines per Inch) dither. On the other hand, a logical sum of a result of conversion of a pixel having a mosaic bit representing that a mosaic image is not detected (0) and an edge bit representing that an edge is detected (1) into binary using the low LPI dither and a result of conversion of the pixel into binary using a dither of a higher LPI relative to the low LPI dither is determined as a result of a binary conversion. By this, an inside portion of a picture or a character and a mosaic image may be reproduced in low LPI and jaggies of an edge of a character or a line may be reduced by a high LPI dither while roughness or increase in a color density of an edge of a picture is suppressed. Color density of the edge of a character or a line is increased and the edge is sharply displayed.

According to the first embodiment, an image process to be performed for enhancing reproducibility of an edge in a mosaic image may be omitted.

Furthermore, according to the first embodiment, since it is determined whether pixels are arranged in a tile pattern in individual horizontal and vertical directions, the determination may be made even on a mosaic image in which sizes of tiles are different between horizontal and vertical directions (for example, an image obtained by enlarging an original image twice in a vertical direction and three times in a horizontal direction as illustrated in FIG. 10D). For example, such an image is generated in a case where different enlargement factors are used in enlargement employing the nearest neighbor method between horizontal and vertical directions.

Moreover, according to the first embodiment, since variation in a range of 1 is tolerated in sizes of tiles, the determination may be made even on a mosaic image which is enlarged by a decimal number by the nearest neighbor method (for example, the image illustrated in FIG. 10E). In FIG. 10E, an image is obtained by enlarging an original image by 2.5 times in the vertical direction and three times in the horizontal direction.

Second Embodiment

In the first embodiment, the fixed threshold value (5, for example) is used as the threshold values of a difference between a target pixel and a reference pixel when the horizontal edge flag image 701 and the vertical edge flag image 704 are generated. However, in a case where JPEG noise is included in a CMYK image, the threshold values are preferably changed where appropriate depending on a degree of the JPEG noise.

Therefore, in a second embodiment, a case where a JPEG noise amount is estimated and threshold values are changed in accordance with a degree of the JPEG noise amount will be described as an example.

Figure 5:
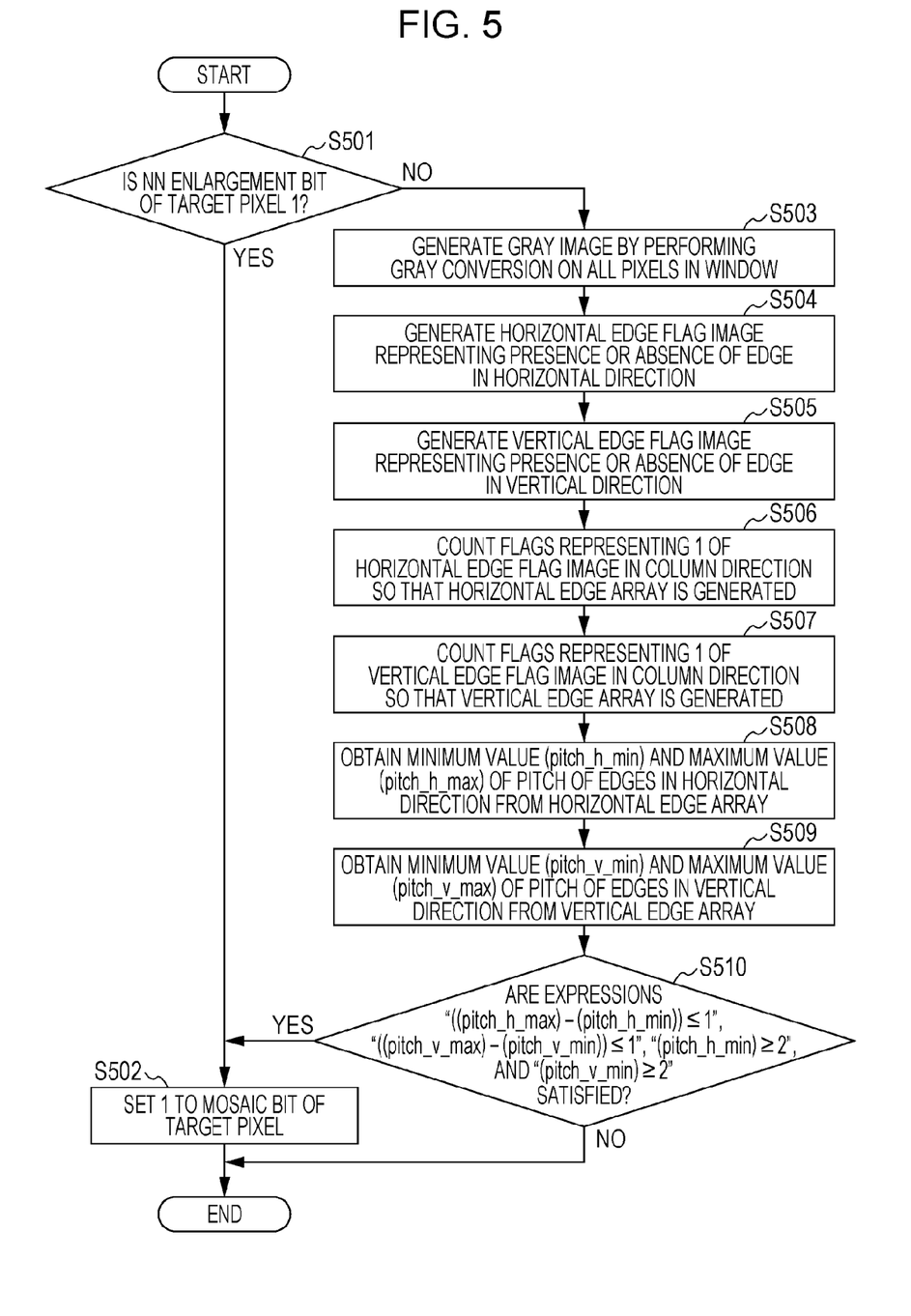
FIG. 5 is a flowchart illustrating a process performed by a mosaic region determination unit according to the first embodiment.

A process performed by a mosaic region determination unit 111 is the same as that of the flow illustrated in FIG. 5. However, a method for determining threshold values used in step S504 and step S505 is different.

Figure 8:
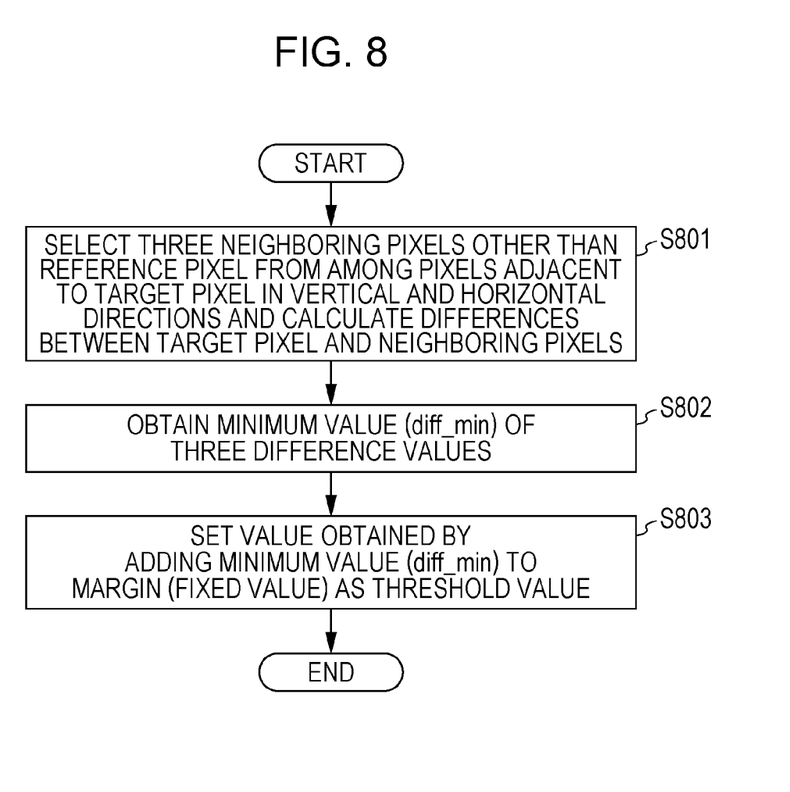
FIG. 8 is a flowchart illustrating a method for determining a threshold value for generation of an edge flag image in horizontal and vertical directions according to a second embodiment.
Figure 9:
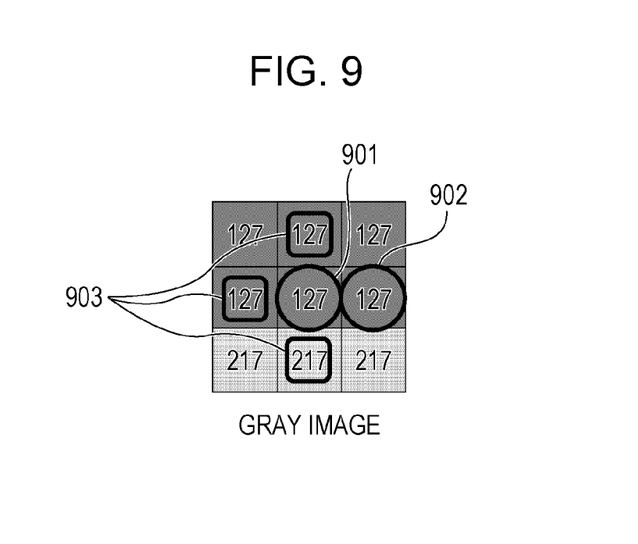
FIG. 9 is a diagram illustrating a target pixel and neighboring pixels obtained when JPEG (Joint Photographic Experts Group) noise is calculated according to the second embodiment.

FIG. 8 is a flowchart illustrating the method for determining the threshold values. To determine a threshold value of a difference between a certain target pixel and a reference pixel which is adjacent to the target pixel on a right side or a lower side, first, differences between the target pixel and neighboring pixels other than the reference pixel among pixels which are adjacent to the target pixel in vertical and horizontal directions are obtained. A state of this calculation will be described with reference to FIG. 9. Three neighboring pixels (903) other than a reference pixel 902 are selected from among pixels positioned adjacent to a target pixel 901 in the vertical and horizontal directions and differences between the target pixel 901 and the three neighboring pixels are obtained (step S801).

Subsequently, a minimum value (diff_min) is obtained from among the three difference values (step S802). The minimum value is obtained since if the target pixel is included in a mosaic region, at least one of the three pixels except for the reference pixel which are adjacent to the target pixel in the vertical and horizontal directions belongs to the same tile. When the pixel included in the same tile is referred to, as a principle, the same signal value is detected (a difference value is 0) if the JPEG noise is not generated but a difference is generated due to the JPEG noise. Accordingly, a degree of the JPEG noise is detected.

Finally, a value obtained by adding a margin (a fixed value, that is, 5, for example, in this embodiment) to the minimum value (diff_min) is determined as the threshold values used in step S504 and step S505.

Note that other methods including a method for calculating values of differences between individual pixels and neighboring pixels in a window and determining a center value or an average value of the difference values as a threshold value may be employed. That is, since difference values between pixels included in the same tile are obtained, a degree of the JPEG noise may be estimated.

According to the second embodiment, even in a case where JPEG noise is included in a CMYK image, deterioration of accuracy of a detection of a mosaic region may be suppressed by appropriately changing threshold values depending on a degree of the JPEG noise.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-108553, filed May 26, 2014, which is hereby incorporated by reference herein in its entirety.

What is claimed is:

1. An image processing apparatus comprising:
a memory storing instructions; and
one or more processors which execute instructions and cause the image processing apparatus to function as:
a first determination unit configured to determine whether a target pixel in an input image is a pixel of an edge portion;
a second determination unit configured to determine whether the target pixel is included in a mosaic image in accordance with pitches between rows and pitches between columns; and
a performing unit configured to enhance reproducibility of an edge to the target pixel in a case where the target pixel is determined to be the pixel of the edge portion and the target pixel is not included in the mosaic image, and not enhance reproducibility of an edge to a target pixel in a case where the target pixel is determined to be a pixel of the edge portion and the target pixel is included in the mosaic image.

2. The image processing apparatus according to claim 1, wherein
black monochromatization is performed on the target pixel when the target pixel has an achromatic color.

3. The image processing apparatus according to claim 1, wherein the second determination unit comprises:
a counting unit configured to count a number of edges in a horizontal direction and a number of edges in a vertical direction included in a window including the target pixel;
a flagging unit configured to set flags in rows and columns having counting results larger than a threshold value; and
a determination unit configured to determine whether the target pixel is included in a mosaic region in accordance with pitches between the rows to which the flags are set and pitches between the columns to which the flags are set.

4. The image processing apparatus according to claim 3, wherein the determination unit determines
in the determining, as the third determination, that is determined that the target pixel is included in a mosaic region when a minimum value of the pitches between the rows and a minimum value of the pitches between the columns are both two or more and a value obtained by subtracting the minimum value from a maximum value of the pitches between the rows and a value obtained by subtracting the minimum value from a maximum value of the pitches between the columns are both one or less.

5. An image processing method comprising:
determining whether a target pixel in an input image is pixel of an edge portion as a first determination;
determining whether the target pixel is included in a mosaic image in accordance with pitches between rows and pitches between columns as a second determination; and
enhancing reproducibility of an edge to the target pixel in a case where the target pixel is determined to the pixel of an edge portion and the target pixel is not included in the mosaic image; and
not enhancing reproducibility of an edge to a target pixel in a case where the target pixel is determined to be a pixel of the edge portion and the target pixel is included in the mosaic image.

6. The image processing method according to claim 5, wherein
black monochromatization is performed on the target pixel in the image process when the target pixel has an achromatic color.

7. The image processing method according to claim 5, wherein
the second determination comprises:
counting a number of edges in a horizontal direction and a number of edges in a vertical direction included in a window including the target pixel;
setting flags in rows and columns having counting results larger than a threshold value; and
determining, as a third determination, whether the target pixel is included in a mosaic region in accordance with a pitch between the rows to which the flags are set and pitch between the columns to which the flags are set.

8. The image processing method according to claim 7, wherein
in the determining, as the third determination, it is determined that the target pixel is included in a mosaic region when a minimum value of the pitches between the rows and a minimum value of the pitches between the columns are both two or more and a value obtained by subtracting the minimum value from a maximum value of the pitches between the rows and a value obtained by subtracting the minimum value from a maximum value of the pitches between the columns are both one or less.

9. A non-transitory computer-readable recording medium storing a program that causes a computer to function as each of the units of an image processing apparatus comprising:
- a first determination unit configured to determine whether a target pixel in an input image is pixel of an edge portion as a first determination;
- a second determination unit configured to determine whether the target pixel is included in a mosaic image as a second determination in accordance with pitches between rows and pitches between columns; and
- a performing unit configured to enhance reproducibility of an edge to the target pixel in a case where the target pixel is determined to be the pixel of the edge portion and the target pixel is not includes in the mosaic image, and not enhance reproducibility of an edge to a target pixel in a case where the target pixel is determined to be a pixel of the edge portion and the target pixel is included in the mosaic image.

\* \* \* \* \*